United States Patent [19]

Moreau et al.

[11] Patent Number: 4,750,190

[45] Date of Patent: Jun. 7, 1988

[54] APPARATUS FOR USING A LEROUX-GUEGUEN ALGORITHM FOR CODING A SIGNAL BY LINEAR PREDICTION

[76] Inventors: Nicolas Moreau, 24 rue Castagnary, 75015 Paris; Henri Barral, 7 rue Pasteur, 92340 Bourg la Reine, both of France

[21] Appl. No.: 33,213

[22] Filed: Apr. 2, 1987

[30] Foreign Application Priority Data

Apr. 3, 1986 [FR] France ................................ 86 04800

[51] Int. Cl.[4] .............................................. H04B 14/00
[52] U.S. Cl. ........................................ 375/27; 381/41; 379/88
[58] Field of Search ...................... 375/25, 27; 381/34, 381/35, 41, 42, 43, 45, 46; 379/88; 370/86, 87

[56] References Cited

U.S. PATENT DOCUMENTS

| | | | |
|---|---|---|---|
| 4,488,005 | 12/1984 | Frantz | 379/199 |
| 4,507,750 | 3/1985 | Frantz et al. | 381/41 |
| 4,696,039 | 9/1987 | Doddington | 379/88 |

FOREIGN PATENT DOCUMENTS

2052219 1/1981 United Kingdom .
2060322 4/1981 United Kingdom .

OTHER PUBLICATIONS

IEEE Electro Journal, May 1982, J. A. Feldman et al., IEEE Transactions on Accoustics, Speech and Signal Processing Journal, Jun. 1977, J. LeRoux et al.

*Primary Examiner*—Robert L. Griffin
*Assistant Examiner*—Stephen Chin
*Attorney, Agent, or Firm*—Cesari and McKenna

[57] ABSTRACT

The invention relates to an apparatus for using the Leroux-Gueguen algorithm for coding a signal by linear prediction. Apparatus applicable to the coding of a signal uses the Leroux-Gueguen algorithm for coding the signal by linear prediction. The apparatus receives at one input, correlation, multiplexers, two multipliers, two adders and a divider which, by successive iterations, calculate intermediate variables making it possible to pass from correlation coefficients $R_i$ to PARCOR coefficients $K_i$.

1 Claim, 1 Drawing Sheet

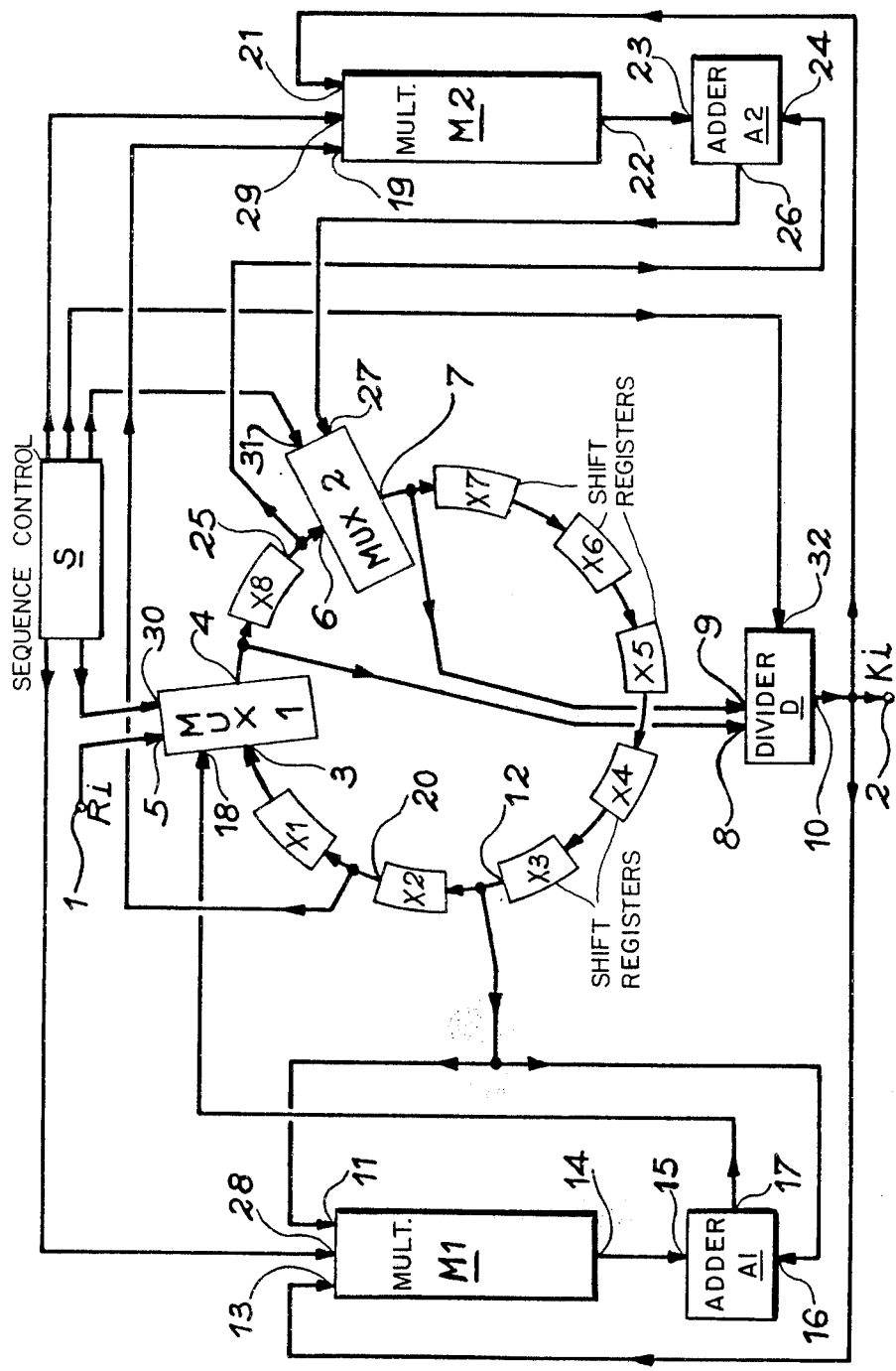

APPARATUS FOR USING A LEROUX-GUEGUEN ALGORITHM FOR CODING A SIGNAL BY LINEAR PREDICTION

BACKGROUND OF THE INVENTION

The present invention relates to an apparatus for using a Leroux-Gueguen algorithm for coding a signal by linear prediction.

The invention applies to the processing of widely varying signals (seismic, biological, speech, radar, telephone and similar signals).

For example, in the case of a low rate television signal transmission, it is desirable to represent the speech signal in a very condensed form, but which still makes it possible to maintain a good intelligibility of speech when the condensed signal is received. Therefore the aim is to produce a synthetic signal which resembles as closely as possible the original signal by a modeling procedure, called coding by linear prediction. This coding involves the signal being sampled at a constant frequency. On the basis of the samples taken for a period for which it is assumed that the statistical characteristics of the signal remain constant, a calculation takes place of the correlation coefficients $R_i$ of the sampled signal, i being an integer ranging e.g. between 0 and 10. These coefficients make it possible to obtain a significant condensing of the characteristic informations of the signal. These correlation coefficients give a good representation model of the original signal. The correlation coefficients $R_i$, as well as the obtaining thereof are described in the article "Single Chip LPC Vocoder" by Stephen P. Pope et al published in IEEE International Solid State Circuits Conference, pp. 118–119, Feb. 22, 1984.

It is also known that after calculating these correlation coefficients, it is then necessary to carry out a non-linear transformation thereof to other coefficients $K_i$, which are called "partial correlation coefficients", which have better sensitivity, classification, coding and similar properties. These coefficients are also called PARCOR coefficients.

The non-linear transformation making it possible to obtain the partial correlation coefficients $K_i$ from correlation coefficients $R_i$ is carried out by using the LEROUX-GUEGUEN algorithm, which is described in an article entitled "A Fixed Point Computation of Partial Correlation Coefficients" by J. Leroux and C. Gueguen published in IEEE Transactions on ASSP in June 1977.

The known apparatuses making it possible to use the LEROUX-GUEGUEN algorithm for obtaining partial correlation coefficients from the correlation coefficients of a signal generally make use of processors associated with memories, together with adders, multiplyers, etc. These apparatuses have a complicated architecture. They require processing programs for obtaining partial correlation coefficients. In no case can these apparatuses constitute a single integrated circuit of small size. They generally occupy a large surface area and their components can cover several cards.

The invention aims at obviating the disadvantages of the existing apparatuses, making it possible to utilize the LEROUX-GUEGUEN algorithm for coding a signal by linear prediction. The invention more particularly makes it possible to obtain an apparatus which can be in the form of a single integrated circuit (or part of a circuit), which has a small surface area, is inexpensive and requires no processing program. Throughout the remainder of the description the partial correlation coefficients will be referred to as PARCOR coefficients.

SUMMARY OF THE INVENTION

The present invention relates to an apparatus for using a LEROUX-GUEGUEN algorithm for coding a signal by linear prediction, said apparatus receiving on one input correlation coefficients $R_i$ of the sampled signal and supplying on one output partial correlation or PARCOR coefficients $K_i$, i being an integer ranging between 1 and a predetermined number p of coefficients, wherein it incorporates 2p shift registers, each connected in annular form, so that one output of a register of rank i+1 is connected to the input of a register of rank i, one input of the register of rank 2p is connected to one output of the register of rank 1, a first multiplexer whereof one input and one output connect the output of the register of rank 1 to the input of the register of rank 2p respectively, another input of said first multiplexer constitutes the input of the apparatus receiving the correlation coefficients $R_i$, a second multiplexer whereof one input and one output connect the output of the register of rank 2p to the input of the register of rank 2p−1 respectively, a divider whereof one input is connected to the output of the first multiplexer and whereof another input is connected to the output of the second multiplexer, an output of said divider constituting the output of the apparatus supplying the PARCOR coefficients $K_i$, a first multiplier whereof one input is connected to one output of the register of rank 3 and whereof another input is connected to the output of the divider, a first adder whereof one input is connected to one output of the first multiplier and whereof another input is connected to the output of the register is rank 3, one output of said first adder being connected to one output of the first multiplexer, a second multiplier whereof one input is connected to the output of the register of rank 2 and whereof another input is connected to the output of the divider, a second adder whereof one input is connected to one output of the second multiplier and whereof another input is connected to the output of the register of rank 2p, one output of the adder being connected to one input of the second multiplexer and sequencing means having control outputs connected to control inputs of the first and second multipliers, first and second multiplexers and the divider for controlling the initialization of the apparatus by loading correlation coefficients $R_i$ into the registers in the form of first intermediate variables $$I_o{}^o = R_o, I_1{}^o = R_1 \ldots I_p{}^o - 1 = R_{p-1} \text{ and}$$

$$E_1{}^o = R_1, E_2{}^o = R_2 \ldots E_p{}^o - 1 = R_p,$$

then for controlling the divider for calculating the first partial correlation coefficient $$K_1 = -\frac{E_1{}^o}{I_o{}^o},$$

then for controlling the multipliers for calculating the new values $$I_o{}^1 = I_o{}^o + K_1 E_1{}^o \ldots, I_p{}^1 - 1 = I_p{}^o - 1 + K_1 E_p{}^o \text{ and}$$

-continued
$$E_1^1 = E_2^o + K_1 I_1^o \ldots, E_p^1 = E_p^o + 1 + K_1 I_p^o$$

of the new intermediate variables which are loaded into the registers for calculating the second partial correlation coefficient $$K_2 = -\frac{E_1^1}{I_0^1}$$

and so on up to the calculation of the partial correlation coefficient $$K_i = -\frac{E_1^i}{I_0^i}$$

of rank i=p.

DESCRIPTION OF THE DRAWING

The features and advantages of the invention can be gathered from the following description relative to the attached drawing which is a block diagram of apparatus for using a LEROUX-GUEGUEN algorithm according to the invention.

DESCRIPTION OF THE PREFERRED EMBODIMENTS

The following description is given in exemplified form for a series—series register architecture. However, only a few minor modifications would be required for a parallel architecture.

On an input 1, the apparatus receives correlation or modeling coefficients $R_i$ of a sampled signal. On an output 2, it supplies partial correlation or PARCOR coefficients $K_i$, i being an integer ranging between 1 and a predetermined number p of coefficients.

The apparatus has 2p shift registers with series input and output. In the embodiment shown in the drawing p=4 and the apparatus comprises 2×4=8 shift registers designated X1, X2, X3, X4, X5, X6, X7, X8. These registers are connected in series in annular manner, so that the output of the register of rank i+1 is connected to the input of the register of rank i. For example, in the drawing, the output of the register of rank i+1=5 is connected to the input of the register of rank i=4. The input of the register of rank 2p is connected to the output of the register of rank 1. In the example shown in the drawing, the input of the register of rank 8 is connected to the output of the register of rank 1. The apparatus also comprises a first multiplexer MUX1, whereof one input 3 and one output 4 connect the output of register X1 of rank 1 to the input of register X8 of rank 2p=8 in the embodiment shown in the drawing. Another input 5 of said first multiplexer constitutes the input of the apparatus receiving the correlation coefficients $R_i$.

The apparatus also comprises a second multiplexer MUX2, whereof one input 6 and one input 7 connect the output of the register of rank 2p (register X8 in the considered embodiment) to the input of the register of rank 2p−1 (register X7 in the drawing).

Outputs 4 and 7 of the first and second multiplexers are respectively connected to the inputs of a series divider D. Output 10 of said divider constitutes the output of the apparatus, which supplies the PARCOR coefficient $K_i$.

The apparatus also comprises a first multiplier M1, whereof one input 11 is connected to one output 12 of the register X3 of rank i=3. Another input 13 of said first multiplier is connected to the output 10 of divider D.

One output 14 of the first multiplier M1 is connected to one input 15 of a first adder A1, whereof another input 16 is connected to the output 12 of register X3 of rank i=3. One output 17 of the first adder A1 is connected to one input 18 of the first multiplexer MUX1.

The apparatus also comprises a second multiplier M2, whereof one input 19 is connected to the output 20 of register X2 of rank i=2. Another input 21 of the second multiplier M2 is connected to the output 10 of divider D.

One output 22 of the second multiplier is connected to one input 23 of a second adder A2. Another input 24 of said second adder is connected to the output 25 of the register of rank 2p (register X8 in the considered embodiment). One output 26 of the second adder A2 is connected to one input 27 of the second multiplexer MUX2.

Finally, the apparatus comprises sequencing means S having control outputs respectively connected to the control inputs 28, 29, 30, 31, 32 of the first and second multipliers M1, M2, the first and second multiplexers MUX1 and MUX2 and divider D. The operation of the apparatus and the function of the sequencing means will be described in greater detail hereinafter. The registers, multiplexers, adders and the divider are not shown in detailed manner in the drawing, because they are well known in the art. Multipliers M1, M2 can be of the type described in the article "Circuits for Digital Signal Processing" by H. Barral and N. Moreau—ICASSP84, San Diego, March 1984.

The operation of the apparatus and particularly the use of the LEROUX-GUEGUEN algorithm will now be described in greater detail.

The processing of correlation coefficients $R_i$ applied to the input of the apparatus and making it possible to obtain PARCOR coefficients $K_i$ uses the LEROUX-GUEGUEN algorithm in which intermediate variables are involved. The successive values i are, as indicated hereinbefore, between 1 and a number p equal to 4 in the considered embodiment. The intermediate variables I, E used in the LEROUX-GUEGUEN algorithm are obtained by processing correlation coefficients $R_i$ by successive iterations formed by the apparatus and as shown in Table 1.

Part A of this table provides a better understanding of the initialization of the apparatus on the basis of values $R_i$ ranging between $R_o$ and $R_p$ (i.e. $R_o$ to $R_4$ in the considered embodiment). On initialization, the first intermediate variables $I_o^o \ldots I_p^o - 1$ respectively correspond to the correlation coefficients $R_o \ldots R_{p-1}$. The first intermediate variables $E_1 \ldots E_p^o$ respectively correspond to correlation coefficients $R_1 \ldots R_p$.

Thus, the initialization of the apparatus consists of loading into the corresponding registers said first intermediate variables. This operation is carried out by applying the successive values $R_o \ldots R_p$ to input 1 of the apparatus and by applying control signals from sequencing means S to the control inputs 30, 31 of multiplexers MUX1, MUX2. Said sequencing and the loading of the corresponding registers appears in Table 2.

According to the embodiment shown in the drawing, the apparatus having eight registers makes it possible to obtain four PARCOR coefficients $K_1 \ldots K_4$ from five correlation coefficients $R_0 \ldots R_4$. Initialization takes place between times $T_0$ and $T_7$ determined by the sequencing means S. At time $T_0$, register X8 of rank $2p=8$ is loaded by bits representing the first correlation coefficient $R_0$. At time $T_1$, binary values representative of the first correlation coefficient $R_0$ are again applied to input 1 of multiplexer MUX1. These bits are applied to the series input of register X8, which transfers its content ($R_0$) into register X7. Obviously at time $T_1$, control signals are applied to the control inputs 31, 32 of multiplexers MUX1, MUX2 by sequencing means S. Thus, at time $T_1$, registers X8 and X7 are respectively loaded by bits corresponding to the first correlation coefficient $R_0$.

Thus, by double repetitions of the values respectively corresponding to the correlation coefficient $R_0$, $R_1$, $R_2$, $R_3$ applied to the inputs of register X8 between times $T_0$ and $T_7$ and by successive shifts of said values into the registers, registers X1, X8 at time $T_7$ are loaded with correlation coefficients $R_0 \ldots R_3$ as indicated in column $T_7$ of Table 2. At time $T_8$ the values corresponding to correlation coefficient $R_4$ are applied to the input of register X8, thus bringing about a supplementary shift of the content of the registers. At time $T_8$, the correlation coefficients whose values are loaded into the registers are indicated in column $T_8$ of Table 2. These contents of registers X1, X8 correspond to the first intermediate values I and E used in the LEROUX-GUEGUEN algorithm. These intermediate values $I_0^o \ldots I_p^o - 1$, $E_1^o \ldots E_p^o$ are, in the considered example, as indicated in column $T_8$ of table 2: $I_0^o \ldots I_3^o$, $E_1^o \ldots E_4^o$.

As from time $T_2$, it is possible to calculate the first PARCOR coefficient $$K_1 = -\frac{E_1^0}{I_0^0}$$

defined in the LEROUX-GUEGUEN algorithm. Thus, at time $T_2$, the values corresponding to correlation coefficients $R_1$ and $R_0$ are respectively available at the input and the output of register X8, which are respectively connected to the inputs of divider D. On its input 32, said divider receives a control signal supplied by sequencing means S.

This initialization phase is described in part A of Table 1.

At time $T_9$ the first iteration starts, which will make it possible to calculate the second PARCOR coefficient $$K_2 = -\frac{E_1^1}{I_1^0}$$

defined in the LEROUX-GUEGUEN algorithm. This first iteration is described in part B of Table 1 and makes it possible to re-update variables I, E. At time $T_9$, the value $I_0^o$ corresponding to the correlation coefficient $R_0$ is applied to the input of register X8 via multiplexer MUX1 controlled by sequencing means S. Thus, the content of each register of rank i is transferred into the register of rank $i-1$. Thus, for example, the content $E_4^o$ of register X8 is transferred into register X7, the content $I_3^o$ of register X7 is transferred into register X6 and so on. The values of the coefficients contained in the different registers at time $T_9$ are indicated in the corresponding column of Table 2.

According to the LEROUX-GUEGUEN algorithm, the new intermediate variables $I_0^1 \ldots I_{p-1}^1$ and $E_1^1 \ldots E_p^1$ are obtained by performing the multiplication and addition operations indicated in part B of Table 1.

The new intermediate variables $I_0^1$ and $E_1^1$ are calculated in the following way. At time $T_8$, the intermediate variable $E_1^o$ is available at the output of register X2. The intermediate variable $I_0^o$ is available at the output of register X8 at time $T_9$. It is therefore possible to calculate by means of multipliers M2/adder A2 the new intermediate variable $I_0^1 = I_0^o + K_1 E_1^o$, which is applied by the output 26 of adder A2 to the input 27 of multiplexer MUX2. This new value $I_0^1$ is loaded into register X7 at time $T_{10}$.

In the same way and as a result of shifts, the value $I_1^o$ is available at the output of register X3 at time $T_8$ and the value $E_2^o$ is available at the output of said register at time $T_9$. Multiplier M1 and adder A1 then calculate the new intermediate variable $E_1^1 = E_2^o + K_1 I_1^o$. This new intermediate variable is supplied to output 17 of adder A1 and is applied to multiplexer MUX1 to be transferred into register X8 at time $T_{10}$.

At time $T_9$, shifts take place in the contents of the registers, so that the content of register X2 is transferred into register X1, the content of register X3 is transferred into register X2 ... and the content of register X8 is transferred into register X7.

As from time $T_{10}$, divider D connected to the inputs of registers X7 and X8 calculates the second PARCOR coefficient $$K_2 = -\frac{E_1^1}{I_0^1}$$

from the contents of registers X8 and X7.

The same shifting and calculating operations are then performed for calculating the new intermediate variable $I_1^1 E_2^1$ at time $T_{12}$, the new intermediate variable $I_2^1$, $I_3^1$ at time $T_{14}$, etc. Thus, as a result of this iteration, there is re-updating of intermediate variables I and E.

As shown by part C of the table, a second iteration identical to the first iteration which has just been described makes it possible to obtain new intermediate variables and to thus calculate the third PARCOR coefficient $$K_3 = -\frac{E_1^2}{I_0^2}.$$

Thus, successive iterations make it possible to arrive at the calculation of the final PARCOR coefficient $$K_i = -\frac{E_i^i}{I_0^i}$$

of rank $i=p$. In the considered embodiment this coefficient is $$K_4 = -\frac{E_1^3}{I_0^3}.$$

Table 3 gives an intermediate calculation to be carried out by the adders, multipliers and the divider for calculating the PARCOR coefficients $K_1$, $K_2$, $K_3$, $K_4$ in the considered embodiment.

TABLE 1
INITIALIZATION

| A | $R_i$ | | $R_i$ |
|---|---|---|---|
| | $T_0^0 = R_0$ | | $F_1^0 = R_1$ |
| | $I_1^0 = R_1$ | | $E_2^0 = R_2$ |
| | $\vdots$ | | $\vdots$ |
| | $I_{p-1}^0 = R_{p-1}$ | | $E_p^0 = R_p$ | calculation of $K_1 = -\dfrac{E_1^0}{I_0^0}$

FIRST ITERATION
Re-updating of variables I and E

| B | $I_0^1 = I_0^0 + K_1 E_1^0$ | $E_1^1 = E_2^0 + K_1 I_1^0$ |
|---|---|---|
| | $\vdots$ | $\vdots$ |
| | $I_{p-1}^1 = I_{p-1}^0 + K_1 E_p^0$ | $E_p^1 = E_{p+1}^0 + K_1 I_p^0$ | calculation of $K_2 = -\dfrac{E_1^1}{I_0^1}$

SECOND ITERATION
Re-updating of variables I and E

| C | $I_0^2 = I_0^1 + K_2 E_1^1$ | $E_1^2 = E_2^1 + K_2 I_1^1$ |
|---|---|---|
| | $\vdots$ | $\vdots$ |
| | $I_{p-1}^2 = I_{p-1}^1 + K_2 E_p^1$ | $E_p^2 = E_{p+1}^1 + K_2 \cdot I_p^1$ | calculation of $K_3 = -\dfrac{E_1^2}{I_0^2}$

| D | SUCCESSIVE ITERATIONS UP TO $K_p$ |
|---|---|

TABLE 2

| | $T_0$ | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ |
|---|---|---|---|---|---|---|---|---|---|---|---|---|---|---|---|---|---|---|---|
| X1 | | | | | | | | $R_0$ | $R_0 = I_0^0$ | $E_1^0$ | $I_1^0$ | $E_2^0$ | $I_2^0$ | $E_3^0$ | $I_3^0$ | $E_4^0$ | $I_0^1$ | | |
| X2 | | | | | | | $R_0$ | $R_0$ | $R_1 = E_1^0$ | $I_1^0$ | $E_2^0$ | $I_2^0$ | $E_3^0$ | $I_3^0$ | $E_4^0$ | $I_0^1$ | $E_1^1$ | | |
| X3 | | | | | | $R_0$ | $R_0$ | $R_1$ | $R_1 = I_1^0$ | $E_2^0$ | $I_2^0$ | $E_3^0$ | $I_3^0$ | $E_4^0$ | $I_0^1$ | $E_1^1$ | $I_1^1$ | | |
| X4 | | | | | $R_0$ | $R_0$ | $R_1$ | $R_1$ | $R_2 = E_2^0$ | $I_2^0$ | $E_3^0$ | $I_3^0$ | $E_4^0$ | $I_0^1$ | $E_1^1$ | $I_1^1$ | $E_2^1$ | | |
| X5 | | | | $R_0$ | $R_0$ | $R_1$ | $R_1$ | $R_2$ | $R_2 = I_2^0$ | $E_3^0$ | $I_3^0$ | $E_4^0$ | $I_0^1$ | $E_1^1$ | $I_1^1$ | $E_2^1$ | $I_2^1$ | | |
| X6 | | | $R_0$ | $R_0$ | $R_1$ | $R_1$ | $R_2$ | $R_2$ | $R_3 = E_3^0$ | $I_3^0$ | $E_4^0$ | $I_0^1$ | $E_1^1$ | $I_1^1$ | $E_2^1$ | $I_2^1$ | $E_3^1$ | | |
| X7 | | $R_0$ | $R_0$ | $R_1$ | $R_1$ | $R_2$ | $R_2$ | $R_3$ | $R_3 = I_3^0$ | $E_4^0$ | $I_0^1$ | $E_1^1$ | $I_1^1$ | $E_2^1$ | $I_2^1$ | $E_3^1$ | $I_3^1$ | | |
| X8 | $R_0$ | $R_0$ | $R_1$ | $R_1$ | $R_2$ | $R_2$ | $R_3$ | $R_3$ | $R_4 = E_4^0$ | $I_0^0$ | $E_1^1$ | $I_1^0$ | $E_2^1$ | $I_2^0$ | $E_3^1$ | $I_3^0$ | $E_4^1$ | $I_0^1$ | $I_0^2$ $E_1^2$ |
| | | | Start of calculation $K_1 = -\dfrac{E_1^0}{I_0^0} = -\dfrac{R_1}{R_0}$ ⇐ | | | | | | | | | | | Start of calculation $K_2 = -\dfrac{E_1^1}{I_0^1}$ ⇐ | | | | | |

TABLE 3

| $K_1 = -\dfrac{E_1^0}{I_0^0}$ | $K_2 = -\dfrac{E_1^1}{I_0^1}$ | $K_3 = -\dfrac{E_1^2}{I_0^2}$ | $K_4 = -\dfrac{E_1^3}{I_0^3}$ |
|---|---|---|---|

| $I_0^0 = R_0$ | $I_0^1 = K_1 E_1^0 + I_0^0$ | $I_0^2 = K_2 E_1^1 + I_0^1$ | $I_0^3 = K_3 E_1^2 + I_0^2$ |
|---|---|---|---|
| $I_1^0 = R_1$ | $I_1^1 = K_1 E_2^0 + I_1^0$ | $I_1^2 = K_2 E_2^1 + I_1^1$ | |
| $I_2^0 = R_2$ | $I_2^1 = K_1 E_3^0 + I_2^0$ | | |
| $I_3^0 = R_3$ | | | |
| $E_1^0 = R_1$ | $E_1^1 = K_1 I_1^0 + E_2^0$ | $E_1^2 = K_2 I_1^1 + E_2^1$ | $E_1^3 = K_3 I_1^2 + E_2^2$ |
| $E_2^0 = R_2$ | $E_2^1 = K_1 I_2^0 + E_3^0$ | $E_2^2 = K_2 I_2^1 + E_3^1$ | |
| $E_3^0 = R_3$ | $E_3^1 = K_1 I_3^0 + E_4^0$ | | |
| $E_4^0 = R_4$ | | | |

What is claimed is:

1. An apparatus for using a LEROUX-GUEGUEN algorithm for coding a sampled signal by linear prediction, said apparatus receiving on one input correlation coefficients $R_i$ of the sampled signal and supplying on one output partial correlation or PARCOR coefficients $K_i$, i being an integer ranging between 1 and a predetermined number p of coefficients, wherein it incorporates 2p shift registers, each connected in annular form, so that one output of a register of rank $i+1$ is connected to the input of a register of rank i, one input of the register of rank 2p is connected to one output of the register of rank 1, a first multiplexer whereof one input and one output connect the output of the register of rank 1 to the input of the register of rank 2p respectively, another input of said first multiplexer constitutes the input of the apparatus receiving the correlation coefficients $R_i$, a second multiplexer whereof one input and one output connect the output of the register of rank 2p to the input of the register of rank 2p−1 respectively, a divider whereof one input is connected to the output of the first multiplexer and whereof another input is connected to the output of the second multiplexer, an output of said divider constituting the output of the apparatus supplying the PARCOR coefficients $K_i$, a first multiplier whereof one input is connected to one output of the register of rank 3 and whereof another input is connected to the output of the said divider, a first adder whereof one input is connected to one output of the first multiplier and whereof another input is connected to the output of the register of rank 3, one output of said first adder being connected to one output of the first multiplexer, a second multiplier whereof one input is connected to the output of the register of rank 2 and whereof another input is connected to the output of the said divider, a second adder whereof one input is connected to one output of the second multiplier and whereof another input is connected to the output of the register of rank 2p, one output of the adder being connected to one input of the second multiplexer and sequencing means having control outputs connected to control inputs of the first and second multipliers, first and second multiplexers and the divider for controlling the initialization of the apparatus by loading correlation coefficients $R_i$ into the registers in the form of first intermediate variables $$I_0^o = R_0, I_1^o = R_1 \ldots I_p^o - 1 = R_{p-1} \text{ and}$$

-continued $$E_1^o = R_1, E_2^o = R_2 \ldots E_p^o - 1 = R_p$$

then for controlling the divider for calculating the first partial correlation coefficient $$K_1 = -\frac{E_1^o}{I_0^o},$$

then for controlling the multipliers for calculating the new values $$I_0^1 = I_0^o + K_1 E_1^o \ldots, I_p^1 - 1 = I_p^o - 1 + K_1 E_p^o \text{ and}$$

-continued $$E_1^1 = E_2^o + K_1 I_1^o \ldots, E_p^1 = E_p^o + 1 + K_1 I_p^o$$

of the new intermediate variables which are loaded into the registers for calculating the second partial correlation coefficient $$K_2 = -\frac{E_1^1}{I_0^1}$$

and so on up to the calculation of the partial correlation coefficient $$K_i = -\frac{E_1^i}{I_0^i}$$

of rank i=p.

* * * * *